No. 715,527. Patented Dec. 9, 1902.
D. R. UDELL.
HORSE HITCHING DEVICE.
(Application filed May 23, 1902.)
(No Model.)
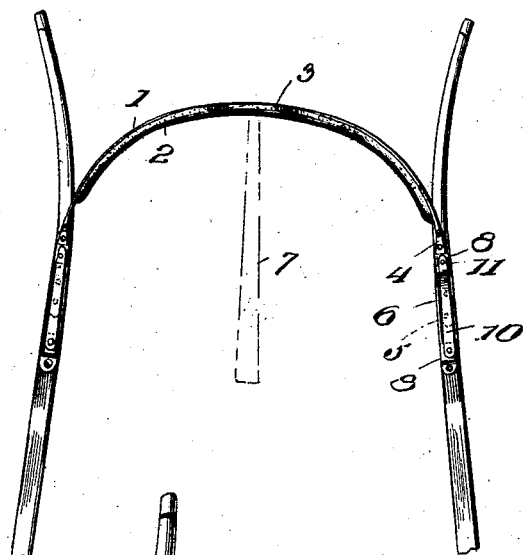
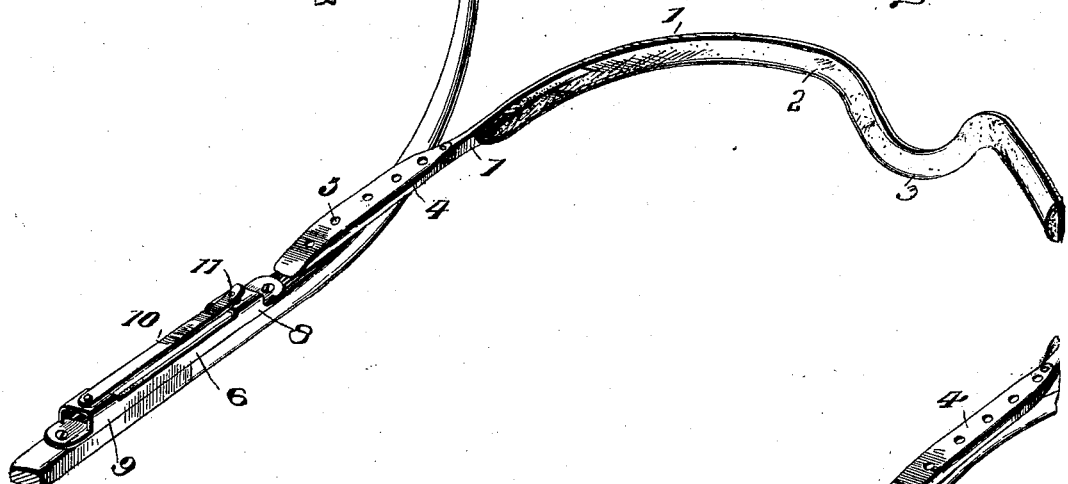
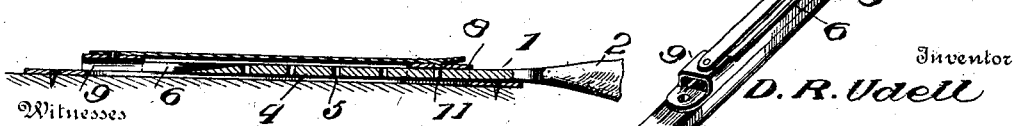
Witnesses
George Watt
Inventor
D. R. Udell
By
R. S. & A. B. Lacey
Attorneys

UNITED STATES PATENT OFFICE.

DAVID R. UDELL, OF DELMAR, NEW YORK.

HORSE-HITCHING DEVICE.

SPECIFICATION forming part of Letters Patent No. 715,527, dated December 9, 1902.

Application filed May 23, 1902. Serial No. 108,688. (No model.)

*To all whom it may concern:*

Be it known that I, DAVID R. UDELL, a citizen of the United States, residing at Delmar, in the county of Albany and State of New York, have invented certain new and useful Improvements in Horse-Hitching Devices; and I do hereby declare the following to be a full, clear, and exact description of the invention, such as will enable others skilled in the art to which it appertains to make and use the same.

This invention has for its object to provide simple and effective means to admit of readily hitching and unhitching a horse, and relates more particularly to the breast-strap or collar and the instrumentalities resorted to for admitting of said strap or collar being detachably connected with the thills.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a top plan view of a breast-strap or collar and the front portion of a pair of thills, showing the means admitting of detachable connection of said breast-strap therewith. Fig. 2 is a detail perspective view of the parts shown in Fig. 1 on a larger scale, the breast-strap being detached from the thills. Fig. 3 is a longitudinal section of an end portion of the breast-strap and the keeper coöperating therewith.

Corresponding and like parts are referred to in the following description and indicated in all the views of the drawings by the same reference characters.

The breast-strap or collar is approximately of bow form and is so shaped as not to exert injurious pressure against the breast of the animal, and is composed, preferably, of a metal body 1, padded upon its inner side, as shown at 2, and having a crimp 3 at a middle point to obviate pressure upon the throat or windpipe. The end portions 4 of the breast-strap are flattened and provided with a series of openings 5, the terminals tapering, so as to readily ender a keeper 6, secured to the top side of each thill. The series of openings 5 provide for adjustable connection of the breast-strap with the thills, and the tapering ends enable said ends to be easily and quickly inserted into the keepers when hitching the animal. The crimp 3, besides clearing the throat, also provides a convenient means for attachment of the martingale 7 thereto, as shown by the dotted lines in Fig. 1.

The keeper 6 may be of any approved construction and may be attached to the thills in any convenient position, so as to prevent contact with the sides of the animal or any part of the harness. It is preferred to apply the keepers to the top side of the thills, as shown, this position having been found to answer all requirements. Each keeper is of box form and is provided near its ends with box-loops 8 and 9 for reception of the end portions 4 of the breast-strap. The top side of the keepers is cut away, and a spring 10 extends thereover. This spring is secured at one end to the crown of the box-loop 9, and its opposite end is provided with a pin or stud 11 to extend through an opening in the crown of the box-loop 8 and engage with a selected opening 5 of the coöperating end of the breast-strap for adjustable connection of the latter with the keeper. The front portion of the spring 10 curves upward to enable the finger to engage thereunder for withdrawal of the pin 11 from engagement with the breast-strap when it is required to disconnect the latter from the thills, as when unhitching the animal from the thills.

The end portions 4 of the breast-strap are jointed to the body portion 1 to admit of their ready adaptation to the position of the keepers 6, thereby preventing any wedging or binding action when fitting the breast-strap to thills. The front end portions of the thills usually flare or are relatively inclined, and if the end portions 4 of the breast-strap were rigid great difficulty would be experienced when hitching and unhitching the animal; but by jointing the said end portions they will readily adapt themselves to the angular position of the keepers and admit of the hitching and unhitching being readily effected.

Having thus described the invention, what is claimed as new is—

1. In combination with a pair of thills and a breast-strap having its end portions made tapering and provided with a series of openings, keepers attached to the thills and comprising box-loops adapted to receive the end of said breast-strap, and springs applied to the keepers and having pins to make adjustable connection with the said openings of the breast-strap, substantially as specified.

2. In combination, with a pair of thills, and a metallic breast strap or collar having its end portions widened, tapered and provided with a series of openings, keepers applied to the thills, each comprising end loops of box form and having the outer portions between the end loops cut away, and a flat spring secured at one end to one of the loops of each keeper and provided at its opposite end with a pin to extend through the other box-loop and make adjustable connection with an end of the breast-strap, the space between the box-loops of each keeper being closed by the said spring, substantially as specified.

In testimony whereof I affix my signature in presence of two witnesses.

DAVID R. UDELL. [L. S.]

Witnesses:
F. M. RADLIFF,
EVALYN VAN VLECK.